(12) United States Patent
Frascati et al.

(10) Patent No.: US 9,230,518 B2
(45) Date of Patent: Jan. 5, 2016

(54) FAULT-TOLERANT PREEMPTION MECHANISM AT ARBITRARY CONTROL POINTS FOR GRAPHICS PROCESSING (71) Applicant: QUALCOMM Incorporated, San Diego, CA (US)

(72) Inventors: Christopher Paul Frascati, Oviedo, FL (US); Murat Balci, Orlando, FL (US); Avinash Seetharamaiah, Chuluota, FL (US); Andrew Evan Gruber, Arlington, MA (US); Alexei Vladimirovich Bourd, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 14/023,170

(22) Filed: Sep. 10, 2013

(65) Prior Publication Data
US 2015/0070369 A1    Mar. 12, 2015

(51) Int. Cl.
G06T 1/00      (2006.01)
G06T 15/00     (2011.01)
G06F 15/00     (2006.01)
G09G 5/399     (2006.01)
G06T 1/20      (2006.01)
G06F 9/46      (2006.01)
G06T 1/60      (2006.01)

(52) U.S. Cl.
CPC ........ G09G 5/399 (2013.01); G06F 9/46 (2013.01); G06T 1/20 (2013.01); G06T 1/60 (2013.01)

(58) Field of Classification Search
None
See application file for complete search history.

(56) References Cited

U.S. PATENT DOCUMENTS

| 6,911,983 | B2 * | 6/2005 | Sabella et al. | 345/536 |
| 7,545,381 | B2 * | 6/2009 | Huang et al. | 345/522 |
| 2007/0103476 | A1 | 5/2007 | Huang et al. | |
| 2007/0136730 | A1 | 6/2007 | Wilt et al. | |
| 2008/0303833 | A1 * | 12/2008 | Swift et al. | 345/505 |
| 2011/0084977 | A1 | 4/2011 | Duluk, Jr. et al. | |
| 2011/0289507 | A1 | 11/2011 | Khan et al. | |
| 2012/0188259 | A1 | 7/2012 | Hartog et al. | |

(Continued)

FOREIGN PATENT DOCUMENTS

EP    2581829 A2    4/2013

OTHER PUBLICATIONS

Calhoun et al., "Preemption of a CUDA Kernel Function," 13th ACIS International Conference on Software Engineering, Artificial Intelligence, Networking and Parallel/Distributed Computing, IEEE, Aug. 8-10, 2012, pp. 247-252, 6 pp.

(Continued)

Primary Examiner — Jacinta M Crawford
(74) Attorney, Agent, or Firm — Shumaker & Sieffert, P.A.

(57) ABSTRACT

This disclosure presents techniques and structures for preemption at arbitrary control points in graphics processing. A method of graphics processing may comprise executing commands in a command buffer, the commands operating on data in a read-modify-write memory resource, double buffering the data in the read-modify-write memory resource, such that a first buffer stores original data of the read-modify-write memory resource and a second buffer stores any modified data produced by executing the commands in the command buffer, receiving a request to preempt execution of the commands in the command buffer before completing all commands in the command buffer, and restarting execution of the commands at the start of the command buffer using the original data in the first buffer.

35 Claims, 6 Drawing Sheets

(56) References Cited

U.S. PATENT DOCUMENTS

| | | |
|---|---|---|
| 2013/0124838 A1 | 5/2013 | Shah et al. |
| 2013/0132711 A1 | 5/2013 | Shah et al. |
| 2013/0162661 A1 | 6/2013 | Bolz et al. |
| 2014/0195708 A1* | 7/2014 | Klein et al. .................. 710/263 |

OTHER PUBLICATIONS

International Search Report and Written Opinion—PCT/US2014/054271—ISA/EPO—Nov. 12, 2014, 11 pp.

* cited by examiner

FAULT-TOLERANT PREEMPTION MECHANISM AT ARBITRARY CONTROL POINTS FOR GRAPHICS PROCESSING

TECHNICAL FIELD

This disclosure relates to techniques for graphics processing, and more specifically to techniques for preemption at arbitrary control points in graphics processing.

BACKGROUND

Visual content for display, such as content for graphical user interfaces and video games, may be generated by a graphics processing unit (GPU). A GPU may convert two-dimensional or three-dimensional (3D) objects into a two-dimensional (2D) pixel representation that may be displayed. Converting information about 3D objects into a bit map that can be displayed is known as pixel rendering, and requires considerable memory and processing power. In the past, 3D graphics capability was available only on powerful workstations. However, now 3D graphics accelerators are commonly found in personal computers (PC), as well as in mobile devices, such as smart phones, tablet computers, portable media players, portable video gaming consoles, and the like. Typically, mobile devices have less computational power and memory capacity as compared to conventional PCs. As such, increased complexity in 3D graphics rendering techniques presents difficulties when implementing such techniques on a mobile device.

In many systems, techniques for preempting execution of commands on a GPU are utilized so that higher priority tasks that require GPU processing may be executed. Such preemption techniques generally include processes whereby the progress of the GPU through one command stream is tracked. In this way, the GPU may transition to the higher priority task, and then return to the original task at the point the GPU stopped.

SUMMARY

In general, this disclosure describes techniques for preemption at arbitrary control points in a graphics processing system. In particular, the techniques of this disclosure allow for a currently executing command buffer on a GPU to be preempted at any point, and for the GPU to quickly transition to a higher priority task. After the higher priority task is completed, the GPU returns to the original command buffer, starting at the beginning. To facilitate such a restart, the techniques of this disclosure propose to double-buffer any read-modify-write memory resources used by the commands in the command buffer, so that the original state of the read-modify-write resource may be restored.

In one example of the disclosure, a method of graphics processing comprises executing commands in a command buffer for a graphics processing unit, the commands operating on data in a read-modify-write memory resource, storing, in a first buffer, original data of the read-modify-write memory resource, storing, in a second buffer, any modified data produced by executing the commands in the command buffer, preempting execution of the commands in the command buffer before completing all commands in the command buffer, and after preempting execution, restarting execution of the commands at the start of the command buffer using the original data in the first buffer.

The techniques of this disclosure are also described in terms of an apparatus, graphics processing unit, and a computer-readable storage medium storing instructions for causing a processor to perform the techniques. The details of one or more examples are set forth in the accompanying drawings and the description below. Other features, objects, and advantages will be apparent from the description and drawings, and from the claims.

DETAILED DESCRIPTION

This disclosure relates to techniques for graphics processing, and more specifically to techniques for preemption at arbitrary control points. In particular, this disclosure relates to techniques for preemption mechanisms for input/output (I/O) devices in a computing system. In particular, this disclosure will be described in terms of preemption mechanisms used in an operating system to stop and resume graphics processing, e.g., graphics processing executed on a graphics processing unit (GPU).

In simple terms, a preemption request on a GPU is a request made by another entity of a graphics processing system (e.g., an application executing on a central processing unit (CPU)) to stop current graphics processing of a command buffer in favor of another, higher priority operation that needs GPU processing. Often, such preemption requests will originate from an operating system. Conventional techniques for preemption of graphics processing rely on the use of so-called "safe points." That is, if a GPU receives a request to preempt current processing, the GPU continues processing up to a particular point (e.g., a particular point in a command buffer) and saves information concerning the state of processing at that point. Such information may include the point in the command buffer at which processing was stopped and should be restarted, the contents of any buffer that receives the output of GPU processing, and the contents of one or more buffers that may be used as input data for any GPU processing at the point in the command.

Saving such state information allows the GPU to restart processing at a known point with the correct input and output data. However, processing up to a safe point and saving state information when a preemption request is received takes an indeterminate amount of time. Preemption requests may happen at asynchronous points in a command buffer executed by the GPU, and as such, it may not be possible to predict how long a GPU may need to operate until the safe point is reached. In some situations, the time for a GPU to reach a safe point, save state information, and start processing a new command buffer in response to a preemption request may be undesirably long. Some applications may result in a poor user experience if higher priority graphics tasks are not able to be started immediately.

In view of these drawbacks, this disclosure presents techniques for processing preemption requests at arbitrary control points. In particular, the techniques of this disclosure include double-buffering a read-modify-write resource used by a GPU to execute a command buffer for an original task, so that the results of partial processing a command buffer may be thrown out, and the command buffer may be re-run from the beginning in response to a preemption request to execute a higher priority task. In this way, preemption requests may be handled immediately, while still maintaining a stable state for which to restart processing of the original task.

In one example, a command stream for graphics processing may read and then modify the contents of a previously rendered frame buffer in order to render a subsequent frame. If the rendering of a current frame is preempted before the frame is completed, the techniques of this disclosure include restarting execution of the command buffer from the start (i.e., start rendering the frame from the beginning) During preemption, the entire content of the command buffer is stored for replay at a later point. If portions of the previous frame buffer had been modified prior to preemption, such portions of the frame buffer would not be the correct input for the currently processed frame. As such, the techniques of this disclosure also include storing a copy of the read-modify-write resource (e.g., the contents of the frame buffer of the previous frame) until an entire command buffer is processed. Any modification to the content of the previous frame buffer is stored in a different buffer (i.e., the read-modify-write buffer is doubled buffered).

Figure 1:
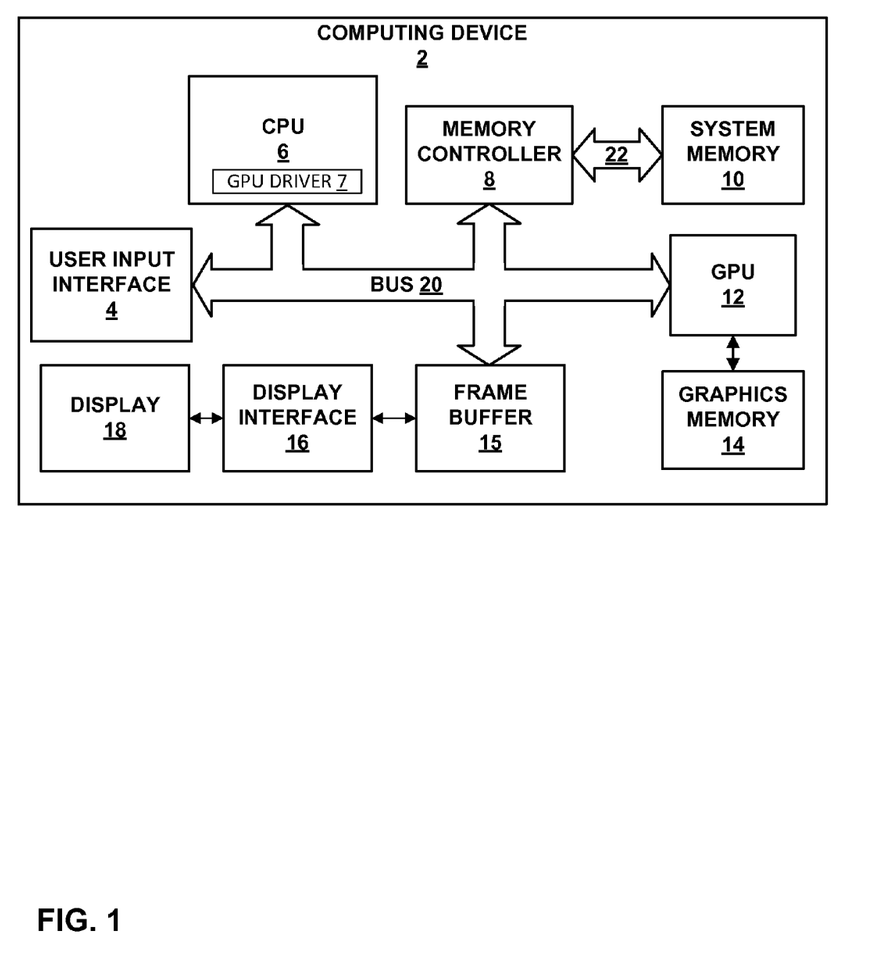
FIG. 1 is a block diagram showing an example computing device configured to use the techniques of this disclosure.

FIG. 1 is a block diagram illustrating an example computing device 2 that may be used to implement the techniques of this disclosure for preemption at arbitrary control points. Computing device 2 may comprise, for example, a personal computer, a desktop computer, a laptop computer, a tablet computer, a computer workstation, a video game platform or console, a mobile telephone such as, e.g., a cellular or satellite telephone, including, e.g., a so-called smartphone, a landline telephone, an Internet telephone, a handheld device such as a portable video game device or a personal digital assistant (PDA), a personal music player, a video player, a display device, a television, a television set-top box, a server, an intermediate network device, a mainframe computer, any mobile device, or any other type of device that processes and/or displays graphical data.

As illustrated in the example of FIG. 1, computing device 2 may include a user input interface 4, a central processing unit (CPU) 6, a memory controller 8, a system memory 10, a graphics processing unit (GPU) 12, a graphics memory 14, a display interface 16, a display 18 and buses 20 and 22. Note that in some examples, graphics memory 14 may be "on-chip" with GPU 12. In some cases, all hardware elements show in FIG. 1 may be on-chip, for example, in a system on a chip (SoC) design. User input interface 4, CPU 6, memory controller 8, GPU 12 and display interface 16 may communicate with each other using bus 20. Memory controller 8 and system memory 10 may also communicate with each other using bus 22. Buses 20, 22 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. Additionally, CPU 6 may execute a GPU driver 7 for controlling the operation of GPU 12. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 (e.g., through GPU driver 7) to cause GPU 12 to perform some or all of the rendering of the graphics data. In some examples, the graphics data to be rendered may include a list of graphics primitives, e.g., points, lines, triangles, quadrilaterals, triangle strips, etc.

Memory controller 8 facilitates the transfer of data going into and out of system memory 10. For example, memory controller 8 may receive memory read and write commands, and service such commands with respect to system memory 10 in order to provide memory services for the components in computing device 2. Memory controller 8 is communicatively coupled to system memory 10 via memory bus 22. Although memory controller 8 is illustrated in FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store a window manager application that is used by CPU 6 to present a graphical user interface (GUI) on display 18. In addition, system memory 10 may store user applications and application surface data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6.

In other examples GPU 12 may be configured to execute general-purpose "shader programs" in order to perform computations for applications other than graphics. Such a use of a GPU is sometimes referred to as a general-purpose GPU (GPGPU). Due the highly parallel nature of GPU processing elements, some types of calculations may be more efficiently performed by a GPU than by a CPU.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to graphics memory 14. Thus, GPU 12 may read data from and write data to graphics memory 14 without using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate memory, but instead utilize system memory 10 via bus 20. Graphics memory 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 12 may store rendered image data in a frame buffer 15. Frame buffer 15 may be an independent memory or may be is allocated within system memory 10. Display interface 16 may retrieve the data from frame buffer 15 and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing by a display processor on display 18. Display 18 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone. Alternatively, display 18 may be a stand-alone device coupled to computing device 2 via a wired or wireless communications link. For instance, display 18 may be a computer monitor or flat panel display connected to a personal computer via a cable or wireless link.

Figure 2:
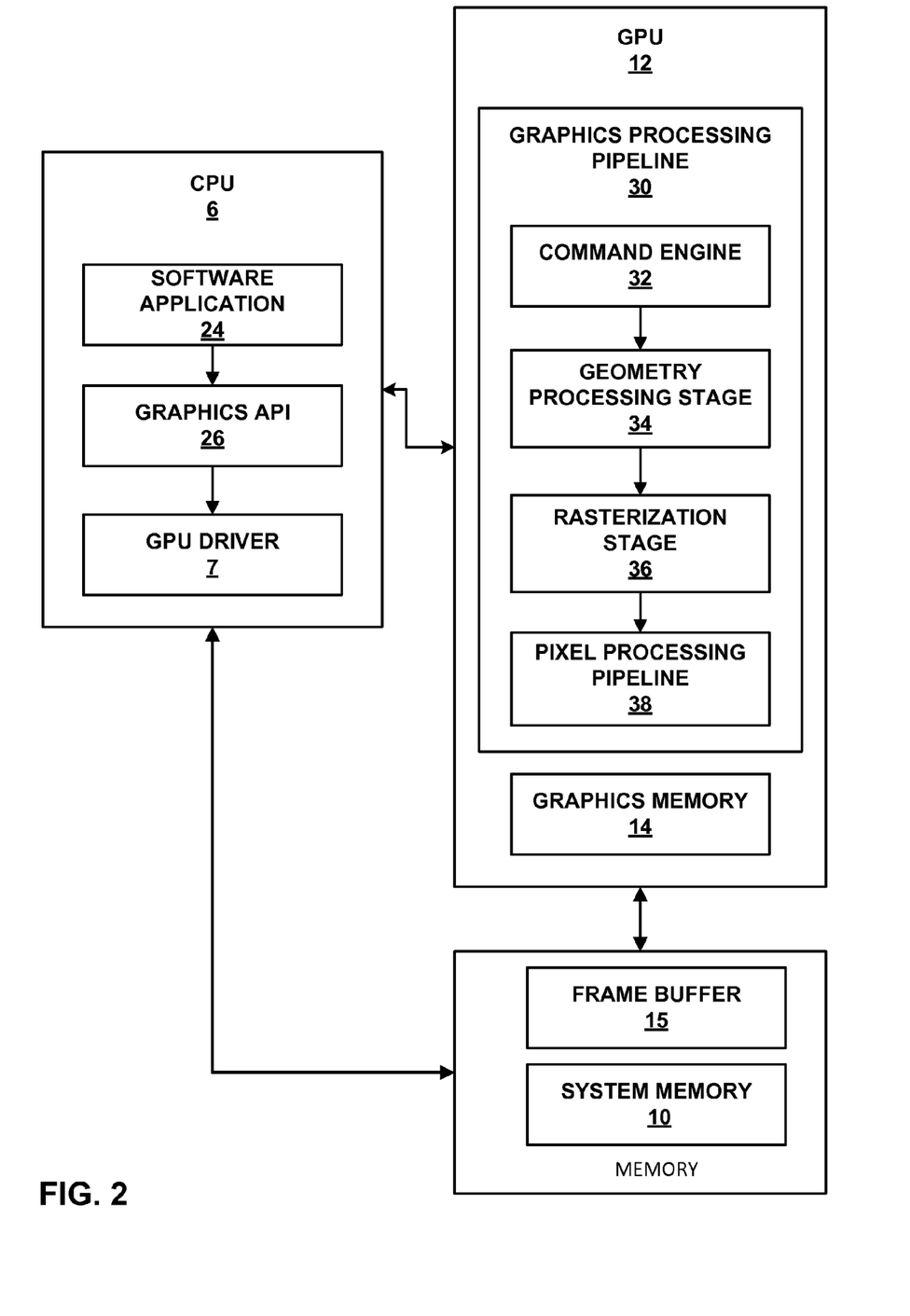
FIG. 2 is a block diagram showing an example graphics rendering system.
Figure 3:
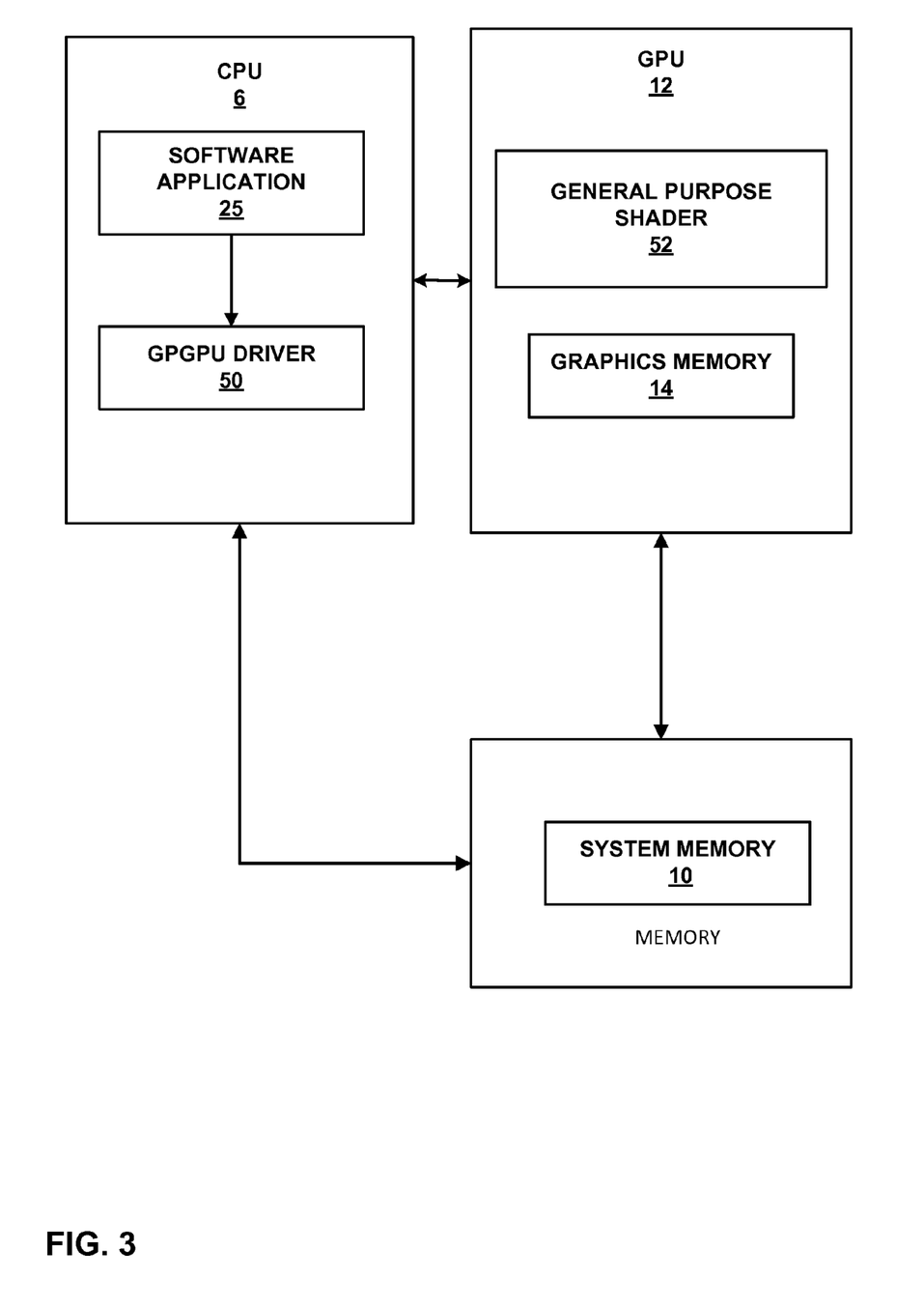
FIG. 3 is a block diagram showing an example general purpose computing system using a GPU.

The preemption techniques of this disclosure may be used for any application of a GPU, including 3D rendering, 2D rendering, GPGPU applications, or any other computations that may be performed by a GPU. FIG. 2 and FIG. 3 show two examples of typical system architectures of two different GPU applications. FIG. 2 is a block diagram illustrating example implementations of CPU 6, GPU 12, and system memory 10 of FIG. 1 in a 2D and/or 3D graphics rendering application. CPU 6 may include at least one software application 24, a graphics API 26, and a GPU driver 7, each of which may be one or more software applications or services that execute on CPU 6. GPU 12 may include a graphics processing pipeline 30 that includes a plurality of graphics processing stages that operate together to execute graphics processing commands. GPU 12 may be configured to execute graphics processing pipeline 30 in a variety of rendering modes, including a binning rendering mode and a direct rendering mode. As shown in FIG. 2, graphics processing pipeline 30 may include a command engine 32, a geometry processing stage 34, a rasterization stage 36, and a pixel processing pipeline 38. Each of the components in graphics processing pipeline 30 may be implemented as fixed-function components, programmable components (e.g., as part of a shader program executing on a programmable shader unit), or as a combination of fixed-function and programmable components. Memory available to CPU 6 and GPU 12 may include system memory 10 and frame buffer 15. Frame buffer 15 may be a part of system memory 10 or may be separate from system memory 10. Frame buffer 15 may store rendered image data.

Software application 24 may be any application that utilizes the functionality of GPU 12. For example, software application 24 may be a GUI application, an operating system, a portable mapping application, a computer-aided design program for engineering or artistic applications, a video game application, or another type of software application that uses 2D or 3D graphics.

Software application 24 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 24 may invoke GPU driver 7, via graphics API 26, to issue one or more commands to GPU 12 for rendering one or more graphics primitives into displayable graphics images. For example, software application 24 may invoke GPU driver 7, via graphics API 26, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like. Based on the instructions issued by software application 24 to GPU driver 7, GPU driver 7 may formulate one or more commands that specify one or more operations for GPU 12 to perform in order to render the primitive. When GPU 12 receives a command from CPU 6, graphics processing pipeline 30 decodes the command and configures one or more processing elements within graphics processing pipeline 30 to perform the operation specified in the command. After performing the specified operations, graphics processing pipeline 30 outputs the rendered data to frame buffer 40 associated with a display device. Graphics pipeline 30 may be configured to execute in one of a plurality of different rendering modes, including a binning rendering mode and a direct rendering mode. The operation of the binning rendering mode and the direct rendering mode will be discussed in more detail below.

GPU driver 7 may be further configured to compile one or more shader programs, and to download the compiled shader programs onto one or more programmable shader units contained within GPU 12. The shader programs may be written in a high level shading language, such as, e.g., an OpenGL Shading Language (GLSL), a High Level Shading Language (HLSL), a C for Graphics (Cg) shading language, etc. The compiled shader programs may include one or more instructions that control the operation of a programmable shader unit within GPU 12. For example, the shader programs may include vertex shader programs and/or pixel shader programs. A vertex shader program may control the execution of a programmable vertex shader unit or a unified shader unit, and include instructions that specify one or more per-vertex operations. A pixel shader program may include pixel shader programs that control the execution of a programmable pixel shader unit or a unified shader unit, and include instructions that specify one or more per-pixel operations. In accordance with some example embodiments of this disclosure, a pixel shader program may also include instructions that selectively cause texture values to be retrieved for source pixels based on corresponding destination alpha values for the source pixels.

As will be explained in more detail below, graphics driver 7 may also be used by software application 24 to issue a preemption request to GPU 12 to stop its current processing in favor of another job.

Graphics processing pipeline 30 may be configured to receive one or more graphics processing commands from CPU 6, via graphics driver 28, and to execute the graphics processing commands to generate displayable graphics images. As discussed above, graphics processing pipeline 30 includes a plurality of stages that operate together to execute graphics processing commands. It should be noted, however, that such stages need not necessarily be implemented in separate hardware blocks. For example, portions of geometry processing stage 34 and pixel processing pipeline 38 may be implemented as part of a unified shader unit. Again, graphics pipeline 30 may be configured to execute in one of a plurality of different rendering modes, including a binning rendering mode and a direct rendering mode.

Command engine 32 may receive graphics processing commands and configure the remaining processing stages within graphics processing pipeline 30 to perform various operations for carrying out the graphics processing commands. The graphics processing commands may include, for example, drawing commands and graphics state commands. The drawing commands may include vertex specification commands that specify positional coordinates for one or more vertices and, in some instances, other attribute values associated with each of the vertices, such as, e.g., color coordinates, normal vectors, texture coordinates and fog coordinates. The graphics state commands may include primitive type commands, transformation commands, lighting commands, etc. The primitive type commands may specify the type of primitive to be rendered and/or how the vertices are combined to form a primitive. The transformation commands may specify the types of transformations to perform on the vertices. The lighting commands may specify the type, direction and/or placement of different lights within a graphics scene. Command engine 32 may cause geometry processing stage 34 to perform geometry processing with respect to vertices and/or primitives associated with one or more received commands.

Geometry processing stage 34 may perform per-vertex operations and/or primitive setup operations on one or more vertices in order to generate primitive data for rasterization stage 36. Each vertex may be associated with a set of attributes, such as, e.g., positional coordinates, color values, a normal vector, and texture coordinates. Geometry processing stage 34 modifies one or more of these attributes according to various per-vertex operations. For example, geometry processing stage 34 may perform one or more transformations on vertex positional coordinates to produce modified vertex positional coordinates. Geometry processing stage 34 may, for example, apply one or more of a modeling transformation, a viewing transformation, a projection transformation, a ModelView transformation, a ModelViewProjection transformation, a viewport transformation and a depth range scaling transformation to the vertex positional coordinates to generate the modified vertex positional coordinates. In some instances, the vertex positional coordinates may be model space coordinates, and the modified vertex positional coordinates may be screen space coordinates. The screen space coordinates may be obtained after the application of the modeling, viewing, projection and viewport transformations. In some instances, geometry processing stage 34 may also perform per-vertex lighting operations on the vertices to generate modified color coordinates for the vertices. Geometry processing stage 34 may also perform other operations including, e.g., normal transformations, normal normalization operations, view volume clipping, homogenous division and/or backface culling operations.

Geometry processing stage 34 may produce primitive data that includes a set of one or more modified vertices that define a primitive to be rasterized as well as data that specifies how the vertices combine to form a primitive. Each of the modified vertices may include, for example, modified vertex positional coordinates and processed vertex attribute values associated with the vertex. The primitive data may collectively correspond to a primitive to be rasterized by further stages of graphics processing pipeline 30. Conceptually, each vertex may correspond to a corner of a primitive where two edges of the primitive meet. Geometry processing stage 34 may provide the primitive data to rasterization stage 36 for further processing.

In some examples, all or part of geometry processing stage 34 may be implemented by one or more shader programs executing on one or more shader units. For example, geometry processing stage 34 may be implemented, in such examples, by a vertex shader, a geometry shader or any combination thereof. In other examples, geometry processing stage 34 may be implemented as a fixed-function hardware processing pipeline or as a combination of fixed-function hardware and one or more shader programs executing on one or more shader units.

Rasterization stage 36 is configured to receive, from geometry processing stage 34, primitive data that represents a primitive to be rasterized, and to rasterize the primitive to generate a plurality of source pixels that correspond to the rasterized primitive. In some examples, rasterization stage 36 may determine which screen pixel locations are covered by the primitive to be rasterized, and generate a source pixel for each screen pixel location determined to be covered by the primitive. Rasterization stage 36 may determine which screen pixel locations are covered by a primitive by using techniques known to those of skill in the art, such as, e.g., an edge-walking technique, evaluating edge equations, etc. Rasterization stage 36 may provide the resulting source pixels to pixel processing pipeline 38 for further processing.

The source pixels generated by rasterization stage 36 may correspond to a screen pixel location, e.g., a destination pixel, and be associated with one or more color attributes. All of the source pixels generated for a specific rasterized primitive may be said to be associated with the rasterized primitive. The pixels that are determined by rasterization stage 36 to be covered by a primitive may conceptually include pixels that represent the vertices of the primitive, pixels that represent the edges of the primitive and pixels that represent the interior of the primitive.

Pixel processing pipeline 38 is configured to receive a source pixel associated with a rasterized primitive, and to perform one or more per-pixel operations on the source pixel. Per-pixel operations that may be performed by pixel processing pipeline 38 include, e.g., alpha test, texture mapping, color computation, pixel shading, per-pixel lighting, fog processing, blending, a pixel ownership test, a source alpha test, a stencil test, a depth test, a scissors test and/or stippling operations. In addition, pixel processing pipeline 38 may execute one or more pixel shader programs to perform one or more per-pixel operations. The resulting data produced by pixel processing pipeline 38 may be referred to herein as destination pixel data and stored in frame buffer 15. The destination pixel data may be associated with a destination pixel in frame buffer 15 that has the same display location as the source pixel that was processed. The destination pixel data may include data such as, e.g., color values, destination alpha values, depth values, etc.

Frame buffer 15 stores destination pixels for GPU 12. Each destination pixel may be associated with a unique screen pixel location. In some examples, frame buffer 15 may store color components and a destination alpha value for each destination pixel. For example, frame buffer 15 may store Red, Green, Blue, Alpha (RGBA) components for each pixel where the "RGB" components correspond to color values and the "A" component corresponds to a destination alpha value. Although frame buffer 15 and system memory 10 are illustrated as being separate memory units, in other examples, frame buffer 15 may be part of system memory 10.

FIG. 3 is a block diagram illustrating example implementations of CPU 6, GPU 12, and system memory 10 of FIG. 1 in a GPGPU application. It should be noted that GPU 12 of system of FIG. 1 may be selectively driven to perform a graphics processing task, a GPGPU task, or any other type of task suitable for a GPU based on the software loaded to run on the GPU as well as the driver used to control operation of the GPU. In the example of FIG. 3, CPU 6 may execute at least one software application 25 and a GPGPU driver 50, each of which may be one or more software applications or services that execute on CPU 6. GPU 12 may be configured to execute a general purpose shader 52. General purpose shader 52 may be any application applicable for execution on GPU 12 that makes use of the parallel nature of the processing elements of GPU 12 to perform calculations. Again, memory available to CPU 6 and GPU 12 may include system memory 10. GPU 12 may also make use of faster, local graphics memory 14.

Software application 25 may be any application that utilizes the functionality of GPU 12. For example, software application 25 may be an application that requires a complex calculation to be made by GPU 12.

Software application 25 may invoke GPGPU driver 50, e.g., to issue one or more commands to GPU 12 for executing general purpose shader 52. As will be explained in more detail below, GPGPU driver 50 may be used by software application 25 to issue a preemption request to GPU 12 to stop its current processing in favor of another job.

As discussed above, this disclosure relates to techniques for graphics processing, and more specifically to techniques for preemption at arbitrary control points. In particular, this disclosure relates to techniques for preemption mechanisms for I/O devices in a computing system. In particular, this disclosure will be described in terms of preemption mechanisms used in an operating system to stop and resume graphics processing operations, e.g., graphics processing executed on a graphics processing unit (GPU).

In simple terms, a preemption request on a GPU is a request made by another entity of a graphics processing system (e.g., an application executing on a central processing unit (CPU)) to stop current graphics processing of a command buffer in favor of another, higher priority operation that needs GPU processing. Typically, such preemption requests will originate from an operating system. As such, the higher priority operation may be any operation executable by GPU 12 that is deemed to be higher priority at that time by the operating system.

Figure 4:
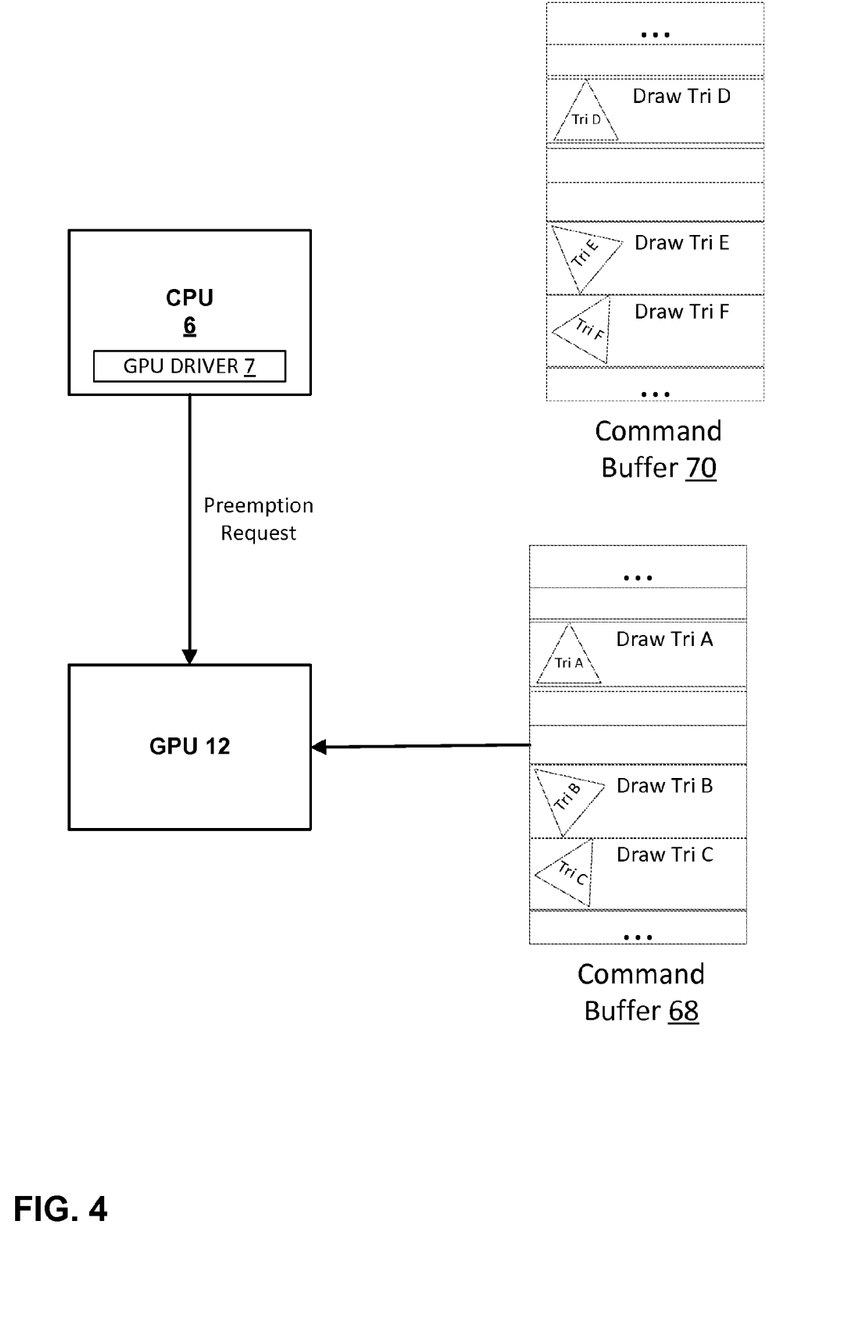
FIG. 4 is a conceptual diagram showing a preemption request.

FIG. 4 is a block diagram illustrating an example preemption request. As shown in FIG. 4, CPU 6 issues a preemption request to GPU 12 to stop executing a current task. In some examples, the preemption request may be communicated to GPU 12 through GPU driver 7. In the example of FIG. 4, the current task executed by GPU 12 is a rendering command stream in command buffer 68. Command buffer 68 depicts draw commands for triangle primitives A, B, and C. The preemption request for CPU 6 instructs the GPU 12 to stop the current task, and instead, begin processing a different task, e.g., the rendering commands shown in secondary command buffer 70. Again, the commands in secondary command buffer 70 are different draw commands for a different set of triangle primitives (e.g., to render a different frame or tile than was currently being rendered through command buffer 68). It should be noted that preemption requests are not restricted to rendering command streams, but may be made to preempt any sort of command stream currently executed by GPU 12 in favor of any type of command stream (rendering, general compute, or other).

Conventional techniques for preemption of graphics processing rely on the use of so-called "safe points." That is, if a GPU receives a request to preempt current processing, the GPU continues processing up to a particular point (e.g., a particular point in a command buffer) and saves information concerning the state of processing at that point. Such information may include the point in the command buffer at which processing was stopped and should be restarted, the contents of any buffer that receives the output of GPU processing, and the contents of one or more buffers that may be used as input data for any GPU processing at the point in the command.

Conventional preemption mechanisms that utilize safe points include both hardware and software implementations. Some software solutions use the size of direct memory access buffer to determine where the safe points are located. Other software solutions use draw boundaries or bin boundaries (i.e., particular regions of the frame) to determine where to locate safe points. Other techniques for preemption may utilize additional hardware support to affect a more granular preemption at the binning, triangle, or pixel level. While generating operating faster than software-only techniques, such hardware techniques require more complexity.

In any case, saving such state information allows the GPU to restart processing at a known point with the correct input and output data. However, processing up to a safe point and saving state information when a preemption request is received takes an indeterminate amount of time. Preemption requests may happen at asynchronous points in a command buffer executed by the GPU, and as such, it may not be possible to predict how long a GPU may need to operate until the safe point is reached. In some situations, the time for a GPU to reach a safe point, save state information, and start processing a new command buffer in response to a preemption request may be undesirably long. Some applications may result in a poor user experience if higher priority graphics task are not able to be started immediately.

For example, a user interface (UI) is an example of an application where long delays in response to a preemption request are undesirable. In general, any application, or portion of an application that is configured to be the focus of a user's attention may benefit from a low delay preemption request of another example (e.g., preempting the rendering of a background in favor or rendering video, pop-up text or any other portion of an application that is the center of a user's focus). Another example application is augmented reality application, where keeping a heads-up display (HUD) positioned appropriately based on the movement of a user's point-of-view may be more important than other tasks being executed by a GPU.

In view of these drawbacks, this disclosure presents techniques for processing preemption requests at arbitrary control points. In particular, the techniques of this disclosure include double-buffering a read-modify-write resource used by a GPU to execute a command buffer for an original task, so that the results of partial processing of a command buffer may be thrown out, and the command buffer may be re-run from the beginning in response to a preemption request to execute a higher priority task. In this way, preemption requests may be handled immediately, while still maintaining a stable and fault-free state (i.e., a state with the correct input data) for which to restart processing of the original task. The techniques of this disclosure may be used alone, or in conjunction with existing safe-point preemption techniques. That is, the techniques of this disclosure may be applied situationally, or per-application, and need not supersede all other preemption techniques.

Figure 5:
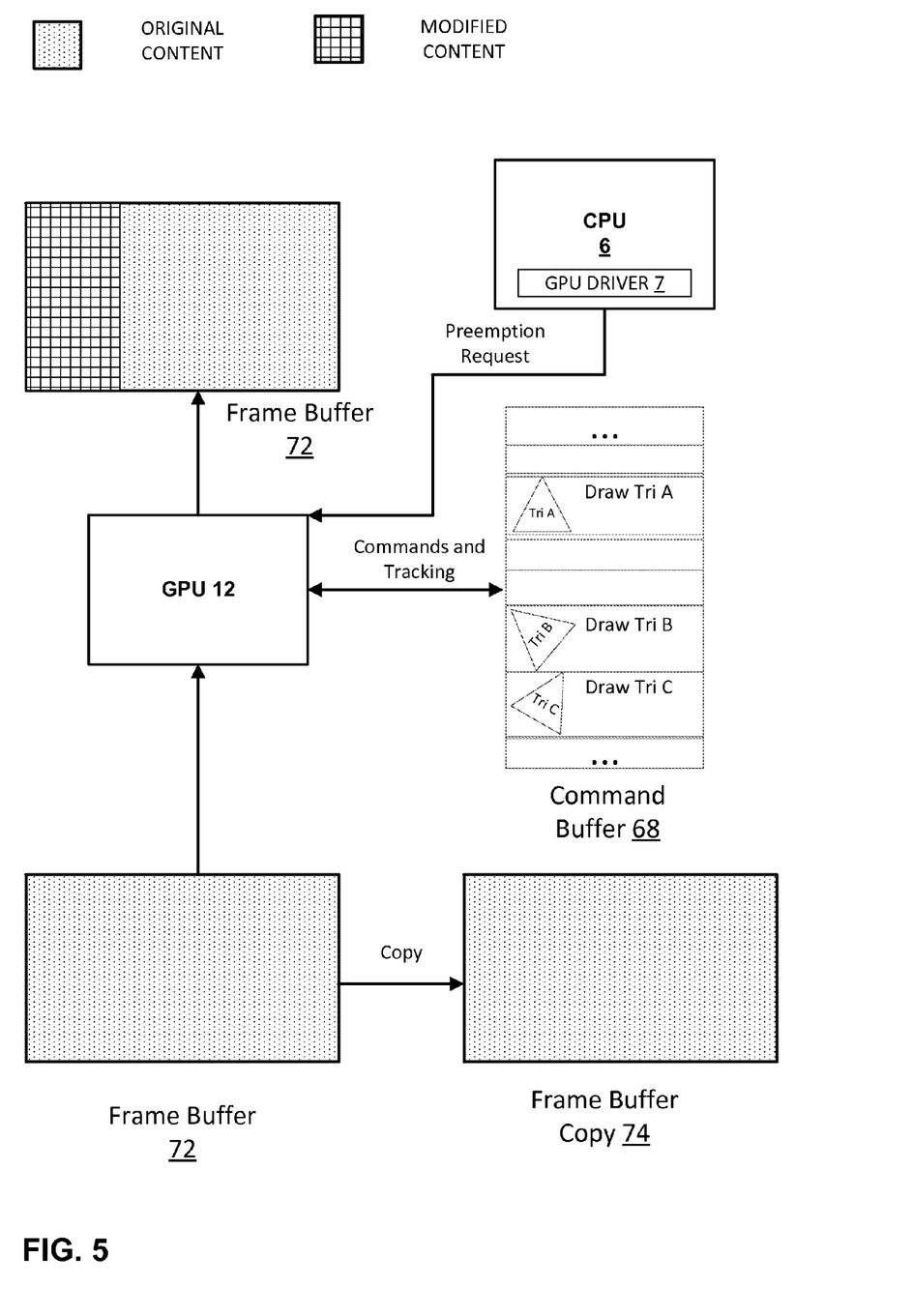
FIG. 5 is a conceptual diagram showing preemption request handling according to one or more examples of this disclosure.

FIG. 5 is a conceptual diagram illustrating the preemption techniques of this disclosure. As shown in FIG. 5, GPU 12 may be configured to execute a command stream in command buffer 68. Again, command buffer 68 may contain any type of commands, including commands for 3D graphics, 2D graphics, GPGPU shader applications, or any other types of commands that may be executed in a GPU. As shown in FIG. 5, command buffer 68 includes 3D graphics rendering commands (e.g., triangle draw commands).

In order to allow for preemption of command buffer 68 at any arbitrary point within the command buffer, any read-modify-write resource used by GPU 12 is copied before any data is modified by GPU 12. As shown in FIG. 5, frame buffer 72 is a read-modify-write resource that may be used as input data for executing the command stream in command buffer 68. Frame buffer 72 is copied by GPU 12 or CPU 6 (i.e., double buffered) so that a copy of frame buffer 72 (frame buffer copy 74) is stored in memory (e.g., a first buffer) before any contents of frame buffer 72 is modified by GPU 12. Modified contents of frame buffer 72 can be considered a second buffer. The techniques of this disclosure are not limited to frame buffers, but may be utilized by any type of read-modify-write resources, including frame buffers, render targets, unorder access view (UAV) buffer, surface, and the like.

In the context of frame buffers, the first buffer (i.e., frame buffer copy 74) is a copy of the previous frame buffer (i.e., the content of the frame buffer before commands are executed in command buffer 68. The second buffer (i.e., frame buffer 72) contains the modified contents for the currently rendered frame buffer (i.e., the current frame buffer).

The first buffer (i.e., frame buffer copy 74), containing a copy of the original content of frame buffer 72, as well as the second buffer (containing the modified content of frame buffer 72) may be configured as separate memory units, separate partitions of a single memory unit, or any other configuration of memory units where the first buffer and the second buffer are separately addressable spaces.

It should be understood that in this context, double buffering is not the same as ping-pong buffering. Ping-pong buffering may involve using two memory buffers (one for reading and one for writing). In the context of this disclosure, double buffering involves storing a copy of a read-modify-write resource (or storing a copy of a portion of such resource) until it has been confirmed that an entire command stream that uses that resource has been completed.

In one example of the disclosure, pending command buffer 68 (or any command stream currently being processed by a GPU 12) is tracked by GPU 12 for completion. If a preemption request (e.g., from an application executing on CPU 6, such as GPU driver 7) occurs at a point before all the commands in command buffer 68 are completed, GPU 12 discards all modified content in frame buffer 72 created up to that point. After completing the task that was the subject of the preemption request, GPU 12 returns to the original command buffer 68 and starts from the beginning of the command stream. In conventional systems, this would not be possible as some of the input data used in the command stream would have been overwritten through the processing of the command stream (e.g., the modified content in frame buffer 72). However, since frame buffer 72 was double buffered, GPU 12 may use frame buffer copy 74 as the input when reinitiating execution of command buffer 68 after preemption. Frame buffer copy 74 would then itself be double-buffered.

In another example of the disclosure, further techniques may be included to avoid a situation where a command buffer is preempted continuously. Since the techniques of this disclosure include restarting a preempted command buffer from the beginning, it can be understood that some command buffers that take longer to complete may be preempted one or more times. To avoid a situation where a command buffer is preempted for longer than desired, this disclosure further proposes to include a counting mechanism, either executed by GPU 12, GPU driver 7, or some application executing on CPU 6, that counts the number of times a particular command buffer has been preempted. If the number of preemptions exceeds some threshold, no further preemptions of that command buffer are allowed. The threshold may vary depending on the type of application being executed by GPU 12. In general, a complex compute job (e.g., a general purpose GPU application) may expect to be preempted more often than other applications and may benefit from techniques where the number of preemptions is capped.

Figure 6:
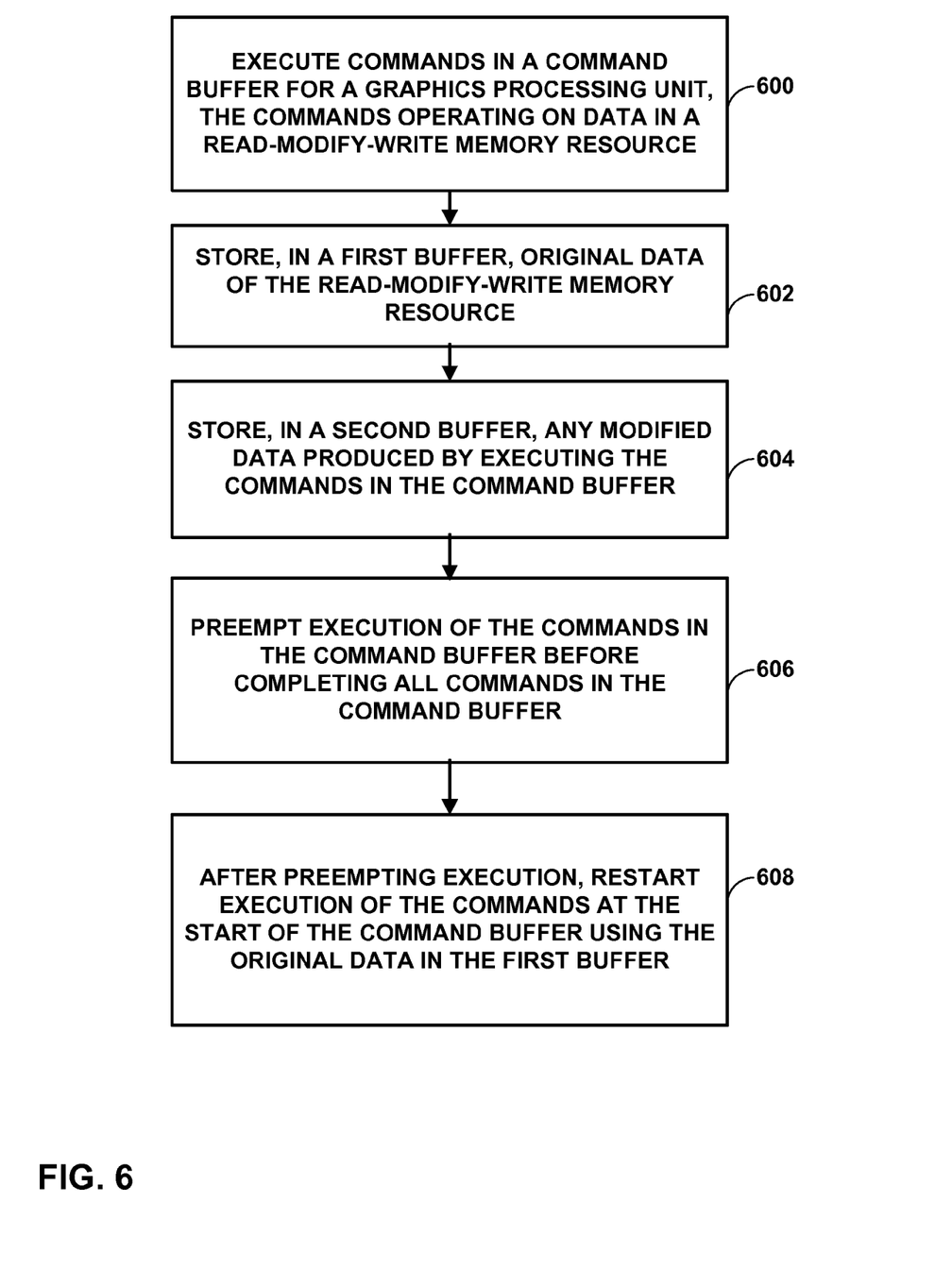
FIG. 6 is a flowchart showing an example method according to the techniques of this disclosure.

FIG. 6 is a flowchart illustrating a method according to one example of the disclosure. The techniques of FIG. 6 may be carried out by one or more processors, including GPU 12 and/or CPU 6.

In on example of the disclosure, GPU 12 may be configured to execute commands in a command buffer for, the commands operating on data in a read-modify-write memory resource (600). GPU 12 may be further configured to store, in a first buffer, original data of the read-modify-write memory resource (602), and store, in a second buffer, any modified data produced by executing the commands in the command buffer (604). In one example of the disclosure, the read-modify-write memory resource is a frame buffer, wherein the first buffer is a copy of the frame buffer for a previous frame and the second buffer is a current frame buffer.

GPU 12 may be further configured to preempt execution of the commands in the command buffer before completing all commands in the command buffer (606). In one example of the disclosure, GPU 12 may be further configured to track completion of the commands in the command buffer to determine of all commands have been completed. After preempting execution, GPU 12 may be further configured to restart execution of the commands at the start of the command buffer using the original data in the first buffer (608).

In another example of the disclosure, GPU 12 may be configured to store the command buffer in a memory, and execute commands in a secondary command buffer in response preempting execution of the commands in the command buffer. In one example of the disclosure, GPU 12 is configured to preempt the execution of the commands in response to a request to preempt execution that is received from software executing on a central processing unit. In one example, the software includes a graphics driver.

In another example of the disclosure, GPU 12 may be configured to track a number of times the command buffer is preempted, refuse preemption in the case that the number of times the command buffer is preempted exceeds a threshold, and a allow preemption in the case that the number of times the command buffer is preempted is below the threshold.

In one or more examples, the functions described above may be implemented in hardware, software, firmware, or any combination thereof. If implemented in software, the functions may be stored as one or more instructions or code on an article of manufacture comprising a non-transitory computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of graphics processing, the method comprising:
    executing commands in a command buffer for a graphics processing unit, the commands operating on data in a read-modify-write memory resource;
    storing, in a first buffer, original data of the read-modify-write memory resource;
    storing, in a second buffer, any modified data produced by executing the commands in the command buffer;
    preempting execution of the commands in the command buffer before completing all commands in the command buffer; and
    after preempting execution, restarting execution of the commands at the start of the command buffer using the original data in the first buffer.

2. The method of claim 1, further comprising:
    tracking completion of the commands in the command buffer.

3. The method of claim 1, further comprising:
    storing the command buffer in a memory; and
    executing commands in a secondary command buffer in response preempting execution of the commands in the command buffer.

4. The method of claim 1, further comprising preempting the execution of the commands in response to a request to preempt execution that is received from software executing on a central processing unit.

5. The method of claim 4, wherein the software includes a graphics driver.

6. The method of claim 1, wherein the read-modify-write memory resource is a frame buffer, and wherein the first buffer is a copy of the frame buffer for a previous frame and the second buffer is a current frame buffer.

7. The method of claim 1, further comprising:
    tracking a number of times the command buffer is preempted;
    refusing preemption in the case that the number of times the command buffer is preempted exceeds a threshold; and
    allowing preemption in the case that the number of times the command buffer is preempted is below the threshold.

8. An apparatus configured for graphics processing, the apparatus comprising:
one or more processors configured to:
execute commands in a command buffer for a graphics processing unit, the commands operating on data in a read-modify-write memory resource;
store, in a first buffer, original data of the read-modify-write memory resource;
store, in a second buffer, any modified data produced by executing the commands in the command buffer;
preempt execution of the commands in the command buffer before completing all commands in the command buffer; and
after preempting execution, restart execution of the commands at the start of the command buffer using the original data in the first buffer.

9. The apparatus of claim 8, wherein the one or more processors are further configured to:
track completion of the commands in the command buffer.

10. The apparatus of claim 8, wherein the one or more processors are further configured to:
store the command buffer in a memory; and
execute commands in a secondary command buffer in response preempting execution of the commands in the command buffer.

11. The apparatus of claim 8, wherein the one or more processors are further configured to preempt the execution of the commands in response to a request to preempt execution that is received from software executing on a central processing unit.

12. The apparatus of claim 11, wherein the software includes a graphics driver.

13. The apparatus of claim 8, wherein the read-modify-write memory resource is a frame buffer, and wherein the first buffer is a copy of the frame buffer for a previous frame and the second buffer is a current frame buffer.

14. The apparatus of claim 8, wherein the one or more processors are further configured to:
track a number of times the command buffer is preempted;
refuse preemption in the case that the number of times the command buffer is preempted exceeds a threshold; and
allow preemption in the case that the number of times the command buffer is preempted is below the threshold.

15. An apparatus configured for graphics processing, the apparatus comprising:
means for executing commands in a command buffer for a graphics processing unit, the commands operating on data in a read-modify-write memory resource;
means for storing, in a first buffer, original data of the read-modify-write memory resource;
means for storing, in a second buffer, any modified data produced by executing the commands in the command buffer;
means for preempting execution of the commands in the command buffer before completing all commands in the command buffer; and
after preempting execution, means for restarting execution of the commands at the start of the command buffer using the original data in the first buffer.

16. The apparatus of claim 15, further comprising:
means for tracking completion of the commands in the command buffer.

17. The apparatus of claim 15, further comprising:
means for storing the command buffer in a memory; and
means for executing commands in a secondary command buffer in response preempting execution of the commands in the command buffer.

18. The apparatus of claim 15, further comprising means for preempting the execution of the commands in response to a request to preempt execution that is received from software executing on a central processing unit.

19. The apparatus of claim 18, wherein the software includes a graphics driver.

20. The apparatus of claim 15, wherein the read-modify-write memory resource is a frame buffer, and wherein the first buffer is a copy of the frame buffer for a previous frame and the second buffer is a current frame buffer.

21. The apparatus of claim 15, further comprising:
means for tracking a number of times the command buffer is preempted;
means for refusing preemption in the case that the number of times the command buffer is preempted exceeds a threshold; and
means for allowing preemption in the case that the number of times the command buffer is preempted is below the threshold.

22. A non-transitory computer-readable storage medium storing instructions that, when executed, cause one or more processors of a device for graphics processing to:
execute commands in a command buffer for a graphics processing unit, the commands operating on data in a read-modify-write memory resource;
store, in a first buffer, original data of the read-modify-write memory resource;
store, in a second buffer, any modified data produced by executing the commands in the command buffer;
preempt execution of the commands in the command buffer before completing all commands in the command buffer; and
after preempting execution, restart execution of the commands at the start of the command buffer using the original data in the first buffer.

23. The non-transitory computer-readable storage medium of claim 22, wherein the instructions further cause the one or more processors to:
track completion of the commands in the command buffer.

24. The non-transitory computer-readable storage medium of claim 22, wherein the instructions further cause the one or more processors to:
store the command buffer in a memory; and
execute commands in a secondary command buffer in response preempting execution of the commands in the command buffer.

25. The non-transitory computer-readable storage medium of claim 22, wherein the instructions further cause the one or more processors to preempt the execution of the commands in response to a request to preempt execution that is received from software executing on a central processing unit.

26. The non-transitory computer-readable storage medium of claim 25, wherein the software includes a graphics driver.

27. The non-transitory computer-readable storage medium of claim 22, wherein the read-modify-write memory resource is a frame buffer, and wherein the first buffer is a copy of the frame buffer for a previous frame and the second buffer is a current frame buffer.

28. The non-transitory computer-readable storage medium of claim 22, wherein the instructions further cause the one or more processors to:

track a number of times the command buffer is preempted;
refuse preemption in the case that the number of times the command buffer is preempted exceeds a threshold; and
allow preemption in the case that the number of times the command buffer is preempted is below the threshold.

29. A graphics processing unit configured to:
execute commands in a command buffer for a graphics processing unit, the commands operating on data in a read-modify-write memory resource;
store, in a first buffer, original data of the read-modify-write memory resource;
store, in a second buffer, any modified data produced by executing the commands in the command buffer;
preempt execution of the commands in the command buffer before completing all commands in the command buffer; and
after preempting execution, restart execution of the commands at the start of the command buffer using the original data in the first buffer.

30. The graphics processing unit of claim 29, further configured to:
track completion of the commands in the command buffer.

31. The graphics processing unit of claim 29, further configured to:
store the command buffer in a memory; and
execute commands in a secondary command buffer in response preempting execution of the commands in the command buffer.

32. The graphics processing unit of claim 29, further configured to preempt the execution of the commands in response to a request to preempt execution that is received from software executing on a central processing unit.

33. The graphics processing unit of claim 32, wherein the software includes a graphics driver.

34. The graphics processing unit of claim 29, wherein the read-modify-write memory resource is a frame buffer, and wherein the first buffer is a copy of the frame buffer for a previous frame and the second buffer is a current frame buffer.

35. The graphics processing unit of claim 29, further configured to:
track a number of times the command buffer is preempted;
refuse preemption in the case that the number of times the command buffer is preempted exceeds a threshold; and
allow preemption in the case that the number of times the command buffer is preempted is below the threshold.

* * * * *